(12) United States Patent
Spooner

(10) Patent No.: US 6,594,863 B2
(45) Date of Patent: Jul. 22, 2003

(54) INSERT FOR FACILITATING MULTI-COMPONENT MOULDING AND METHOD OF MOULDING

(75) Inventor: Gregory Clegg Spooner, Causeway Bay (HK)

(73) Assignee: Hayco Manufacturing Ltd., Causeway Bay (HK)

( * ) Notice: Subject to any disclaimer, the term of this patent is extended or adjusted under 35 U.S.C. 154(b) by 0 days.

(21) Appl. No.: 09/897,733

(22) Filed: Jul. 3, 2001

(65) Prior Publication Data

US 2003/0005550 A1 Jan. 9, 2003

(51) Int. Cl.[7] .............................. A47J 45/00; E05B 1/00
(52) U.S. Cl. .............................. 16/436; 16/431; 16/902; 16/DIG. 12; 16/DIG. 19; 81/489; 81/177.1
(58) Field of Search ........................ 16/436, 431, 430, 16/902, 441, 422, DIG. 12, DIG. 18, DIG. 19; 81/489, 436, 177.1, DIG. 5; 74/551.9, 543, 553; 40/661.12, 314, 331, 663

(56) References Cited

U.S. PATENT DOCUMENTS

| 1,974,682 A | * | 9/1934 | Margoshes | ................. 16/110.1 |
|---|---|---|---|---|
| 5,562,928 A |   | 10/1996 | Ando et al. | |
| 5,964,009 A | * | 10/1999 | Hoepfl et al. | ................. 16/430 |
| 6,094,781 A | * | 8/2000 | Jansson et al. | ................ 16/431 |
| 6,108,870 A | * | 8/2000 | Lo | ............... 16/431 |
| 6,122,802 A | * | 9/2000 | Lo | ............... 16/431 |
| 6,195,830 B1 | * | 3/2001 | Bruschi | .................... 15/143.1 |
| 6,199,460 B1 |   | 3/2001 | Lo | |
| 6,230,366 B1 | * | 5/2001 | Lin | ............... 16/431 |

FOREIGN PATENT DOCUMENTS

| DE | 36 22 596 A1 | 1/1987 |
| JP | 10-202555 A | 8/1998 |

* cited by examiner

Primary Examiner—Chuck Y. Mah
(74) Attorney, Agent, or Firm—Sughrue Mion, PLLC

(57) ABSTRACT

A handle for a hand-held or operated object or appliance comprises a main body (4) of a rigid material and a separate moulding insert (14) which can be fitted on the main body and having a raised pattern or shape ("HO") including at least one element thereon of closed form, the insert (14) defining therein or defining with the main body a bore or bores (18, 24) which communicate with the interior of the element of closed form, through which a soft plastics material such as an elastomer being overmoulded on the handle can flow.

6 Claims, 2 Drawing Sheets

INSERT FOR FACILITATING MULTI-COMPONENT MOULDING AND METHOD OF MOULDING

BACKGROUND OF THE INVENTION

The present invention relates to use of an insert for facilitating multi-component moulding of handles where a second or further component is moulded onto a core, to a handle with such an insert and to a method of moulding using such an insert.

Handles for a wide variety of objects are commonly formed of plastics materials chosen for their ease of fabrication lightness, strength and rigidity, and cost.

In recent years it has become popular to mould handles in more than one moulding step where for example the second or further moulded material is of a contrasting colour for decorative reasons, or being of a different plastics material selected for its different properties. In this case the first plastics material is moulded to form a base or core with the second or further material moulded onto or over the core.

As an example, in recent years it has become popular to provide handles with so-called "soft grips", which are regions or coverings of a soft plastics material. Elastomers are particularly effective for this purpose as they provide a high degree of resilience which assists in the firm grasping of the handle by a user. Generally the main body of the handle is formed of a plastics material which provides the required rigidity with the elastomer being moulded onto the main body in a second moulding step. The elastomer may be formed of a highly contrasting colour to the plastic of the main body whereby it is readily apparent to the user that a soft grip is provided, and the handle takes on an eye-catching and attractive appearance.

It is also often times desirable to mould the overmoulded plastics in a pattern whereby either the overmoulded plastics or the base plastics are of contrasting colour and arranged to forms words, such as for example brand names, or logos, or other decorative devices. This however leads to difficulties in the design of the mould and/or the shape of the base or core. A particular difficulty exists when trying to form shapes or letters of the alphabet which have a closed form, such as a letter "O"; if it is desired to have the letter formed of the base plastic and the centre of the "O" in the second overmoulded plastic one faces the difficulty of getting the second material to the centre of the "O". One approach is to construct the mould so that a mould channel is directed at the centre of the "O". Whilst this may be acceptable for a simple shape, this becomes difficult or impossible for the moulding of intricate patterns, since the fabrication of the mould becomes unduly complex and expensive. A commonly used approach with some products is to hollow out the product behind the "O" to the opposite thereof and provide an internal channel of communication with another surface region where the second plastic is being applied. For example, in a toothbrush handle it is desirable to have a large part of the handle with a soft grip of a soft plastics moulded onto a more rigid core, but to include a brand name on a lower part of the handle where this is formed of the plastic of the core and contrasting in colour with the soft plastic. The handle is formed with a cavity extending to the opposite side of the handle underlying the brand name whereby on moulding of the soft plastic this enters all the openings therein. This approach however places constraints on product design as the appropriate hollowed out regions have to be provided. This itself leads to additional complications in moulding of the main core.

The present invention is directed to overcoming the above drawbacks.

SUMMARY OF THE INVENTION

According to a first aspect of the present invention there is provided a mould-facilitating insert for attachment to a body of a handle onto which a plastics material is to be overmoulded, the insert defining a pattern or shape in which there is at least one element of closed form, the insert defining a bore extending through the insert which communicates with the interior of said element.

The use of such an insert allows the moulding of patterns of plastic material of contrasting colour or properties, which may include intricate patterns or words without the requirement for complex cavity shapes or internal bores to be formed in the main body.

The insert may include locating means, for example lugs for co-operation with recesses on a handle body which facilitate the correct positioning of the insert on the body.

In a further aspect of the present invention there is provided a handle for a hand-held or operated object or appliance comprising a body of a rigid material and a separate moulding insert which can be fitted onto the body and having a raised pattern or shape thereon including at least one element of closed form, the insert defining therein a bore or bores which communicates with the interior of the element of closed form.

The insert may have a width and a thickness, with the width being greater than the thickness, and the bore extending from opposite faces of the insert through the thickness, and with a lower face of the insert at which it is to be connected to the main body provided with a channel which extends laterally across the insert communicating with the bore.

The insert has an upper face formed with the raised pattern or shape and a lower face at which the insert is fitted on the main body, and a bore extending from the interior of the element of closed form to the opposite lower face where it joins a channel provided laterally across the lower face of the insert.

The invention also resides in a handle as defined above on to which a layer of plastics material, which may be a soft material such as an elastomer, is moulded on to the main body having the insert fitted therein, and over the insert with the exception of the raised pattern, whereby the plastics material extends through the bore or bores to the interior of the element of closed form.

In a still further aspect the invention resides in a method of overmoulding a layer of plastics material onto a body where the body carries a pattern or shape having at least one element of closed form, comprising the steps of (a) providing a body and a separate insert having the pattern or shape arranged in a raised manner thereon wherein the insert defines therein or with the body a bore or bores which communicate with the interior of the element of closed form; (b) fitting the insert to the body; (c) placing the body with fitted insert into a mould cavity and moulding a plastics material thereon which flows through the bore or bores to the interior of the element of closed form.

BRIEF DESCRIPTION OF THE DRAWINGS

An embodiment of the invention is described, by way of example only, with reference to the following drawings in which.

DETAILED DESCRIPTION OF THE PREFERRED EMBODIMENT

Figure 1:
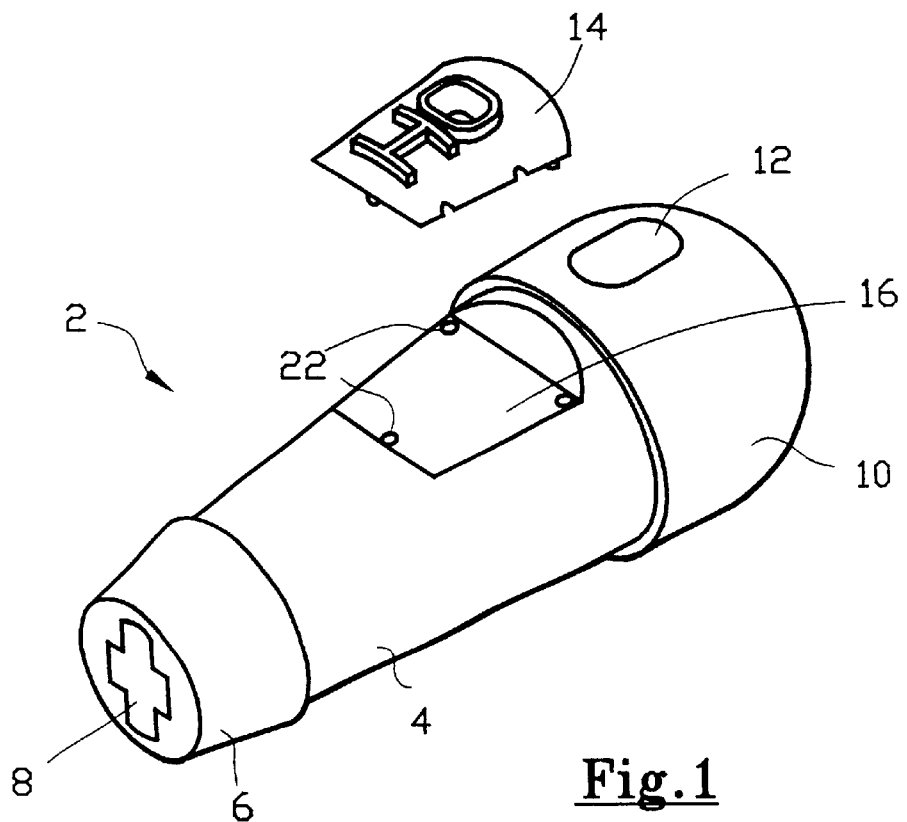
FIG. 1 is a view of a handle with insert according to an embodiment of the invention.

Turning to the Figures, the invention is illustrated with respect to formation of a handle for a domestic hand-held utensil. FIG. 1 shows a handle 2 which comprises an elongate main body 4 having an end region 6 adapted to receive a tool part for example of a kitchen utensil, a cruciform-shaped opening being provided to receive the tool part. An opposite end of the handle 10 is provided with an opening 12 for hanging purposes. Although a handle for a kitchen utensil is shown the handle may have a wide variety of uses, for example as a handle for hand tools, machine tools, domestic appliances, brushware, toothbrushes, garden tools and utensils, and a wide variety of other purposes.

The main body 4 may be formed of a variety of materials with the requirement that the material have sufficient rigidity for the intended purpose of the handle. For many applications the body will be formed of a plastics synthetic material.

In order to improve the user's grip on the handle a layer of a soft plastics material is moulded on to the main body 4, in the illustrated embodiment covering a major part of the exterior of the main body 4 but leaving the end portions 6 and 10 exposed. To do this the main body 4 is placed in a mould having a mould cavity defining a surface as indicated by the dotted lines in FIG. 2 whereby it constitutes an overmould core, and the soft plastics material injected into the mould cavity. A variety of soft plastics materials can be used such as elastomers.

In order to form a pattern which may be a word such as a brand name, or a logo or other decorative pattern the pattern is provided on a separate insert 14 in the form of a raised pattern. By way of illustration, the Figures show the letters "HO" formed raised up from the surface of the insert 14. The insert 14 may likewise be formed of a variety of materials, but typically will be moulded of a synthetic plastics material. The main body 4 is formed with a flat region 16 which receives the insert 14 in a manner whereby when the insert 14 is fitted on to the main body 4 as in FIG. 2 a continuous outer surface is formed but with the raised letters "HO" extending therefrom.

Figure 3:
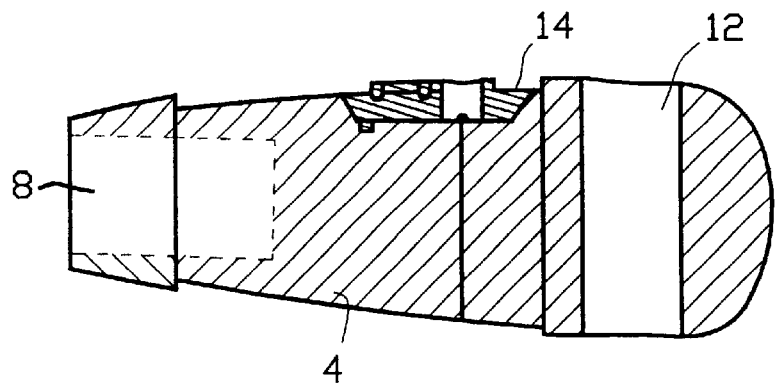
FIG. 3 is a longitudinal cross-sectional view of the handle along the line A—A of FIG. 1.
Figure 4:
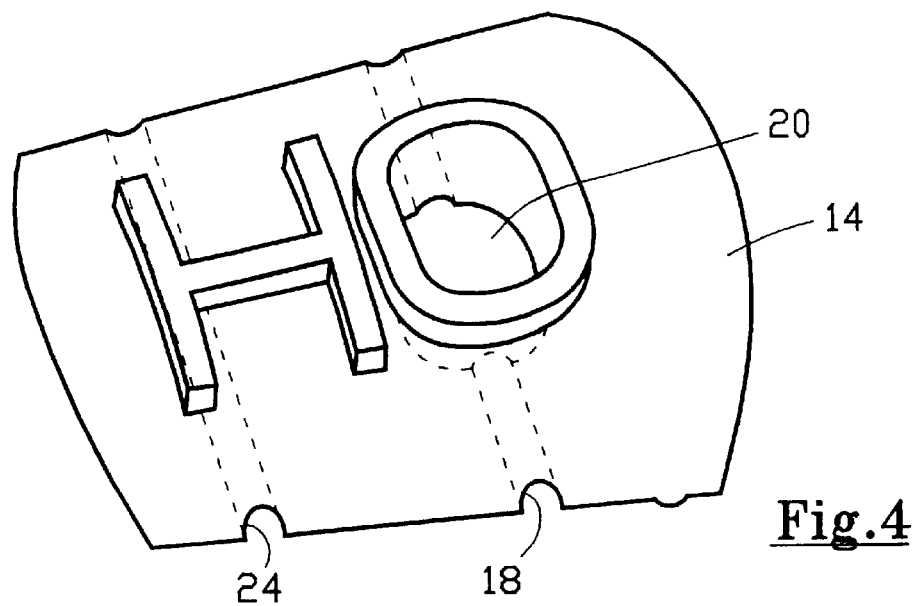
FIG. 4 is an enlarged view of the insert from above.
Figure 5:
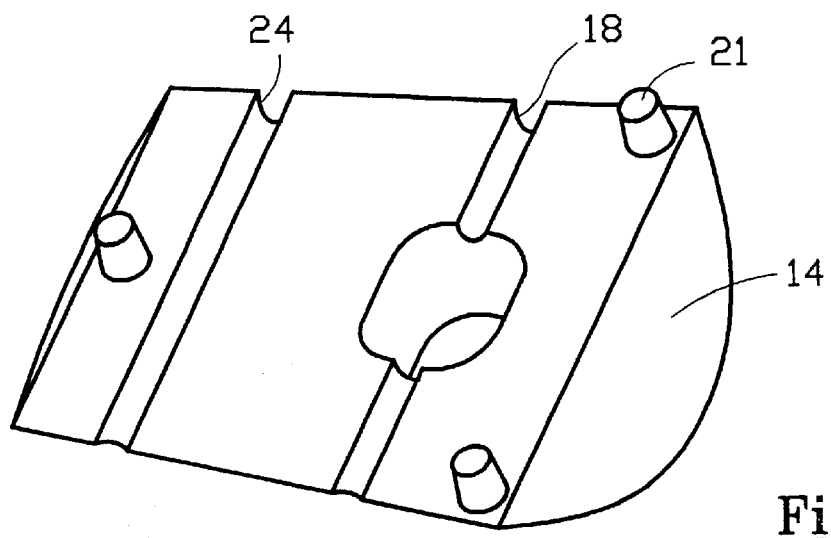
FIG. 5 is an enlarged view of the insert from below.

As can be seen more particularly in FIGS. 3, 4 and 5 the insert 14 is formed with channels 18 which extend across the underside of the insert to a central bore 20 which extends up into the centre of the "O". Locating means are provided in the form of pegs or lugs 21 on the insert which fit into corresponding openings 22 in the main body to facilitate the correct positioning of the insert 14 on the main body 4. As an alternative the positions of lugs 21 and openings 22 could be reversed. A wide variety of other means for locating and/or fixing the insert could be utilised, such as clips, screws, studs, adhesive or other fixings. However, for many applications the locating lugs and openings are sufficient, as the soft plastics material covering will adequately hold the insert on the main body 4.

Figure 2:
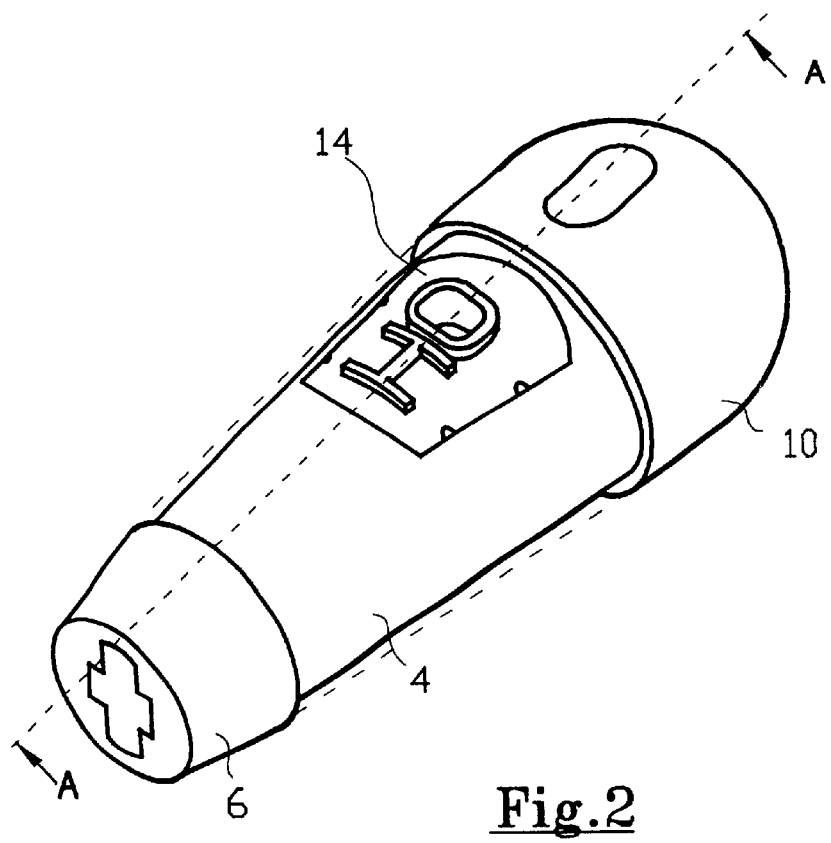
FIG. 2 shows the handle with insert fitted.

Once the insert 14 is fitted on the main body 4 the combination is placed in the mould having a cavity defining the surface indicated by the dotted lines in FIG. 2. When the insert 14 is fitted on to the main body the channels define with the main body bores through which the soft plastics material can flow. The soft plastics material is injected into the cavity at an elevated temperature, flowing through the bores and into the interior of the "O".

The use of the insert 14 thereby allows a pattern of contrasting plastics having regions of closed form to be readily provided. For example the insert may be of one colour, the main body of a second, and the overmoulded plastic of a third. A further advantage is that a variety of different patterns can be moulded on to exactly the same shape of main body, by utilizing different inserts.

It is also found that the insert structure employing the channels as described leads to a clean and precise infill of the interior of the "O" due to the pressure exerted by the injected overmould elastomer between the insert 14 and the main body forcing the upper surface of the "O" tightly against the mould cavity surface whereby an effective seal is formed therebetween, and preventing the overmould elastomer from seeping therebetween.

It can also be arranged that the insert carry additional channels such as that indicated 24, for example these may be arranged at spaced positions along the length of the insert 14 at positions corresponding to each letter of a word, whereby a manufacturer need only change the surface which forms the upper (outer) surface of the insert and the internal bore leading thereto when forming a different pattern or word.

Thus, the channel 24 is redundant for forming a letter "H" but should the manufacturer wish instead to mould the letters "DO", the channel 24 would be required, and the mould for forming the underside of the insert 14 would require no change.

Although the invention is described above in relation to overmoulding of a soft elastomer onto a more rigid core, it is equally applicable to the overmoulding of any plastics material onto a core where an intricate pattern is formed between the contrasting materials and/or colours thereof as described above.

What is claimed is:

1. A handle for a hand-held or operated tool or appliance comprising a body of rigid material and a separate mold-facilitating insert having a base, the body defining a cutout region which is of complementary shape to the base whereby the base fits within the cutout region, the insert having an upper surface from which a raised pattern or shape protrudes including at least one raised element of closed form, and a lower opposite surface which abuts the body, wherein the insert defines an internal bore or bores which extend between the interior of the element of closed form to the opposite lower surface where the bore or bores join a channel or channels provided laterally across the lower surface of the insert.

2. A handle according to claim 1, wherein the base is of greater lateral dimension than the raised pattern or shape.

3. A handle according to claim 1, further comprising a layer of a plastic material molded onto the body having the insert fitted therein, and over the base of the insert, but with the raised pattern or shape exposed, and whereby the plastic material extends through the channel or channels and bore or bores to the interior of the element of the closed form.

4. A handle according to claim 3, wherein the plastic material is a soft elastomeric material.

5. A handle according to claim 1, wherein locating means are provided on the lower surface of the base to correctly position the insert on the handle body.

6. A handle according to claim 5, wherein the locating means comprise one or more lugs on the insert for co-operation with corresponding openings in the handle body.

* * * * *